United States Patent

Aoki et al.

[11] Patent Number: 6,111,664
[45] Date of Patent: *Aug. 29, 2000

[54] IMAGE PROCESSING METHOD, APPARATUS AND CONTROLLER

[75] Inventors: Akio Aoki, Tokyo; Takao Aoki, Abiko; Kaoru Seto, Chigasaki; Seiji Sagara, Kawasaki; Satoshi Shimizu, Ohmiya; Katsuhiko Nishimura, Yokohama; Kazuro Yamada, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/989,683

[22] Filed: Dec. 12, 1997

Related U.S. Application Data

[63] Continuation of application No. 08/426,275, Apr. 21, 1995, abandoned.

[30] Foreign Application Priority Data

Apr. 22, 1994 [JP] Japan .................................. 6-107856
Apr. 18, 1995 [JP] Japan .................................. 7-92385

[51] Int. Cl.$^7$ ...................................................... H04N 1/40
[52] U.S. Cl. ........................... 358/448; 358/458; 358/461
[58] Field of Search .................................. 358/448, 455, 358/456, 458, 461, 471, 443, 429; 382/162, 163, 166, 167

[56] References Cited

U.S. PATENT DOCUMENTS

| | | | |
|---|---|---|---|
| 5,142,356 | 8/1992 | Usami et al. | 358/80 |
| 5,276,459 | 1/1994 | Danzuka | 346/33 A |
| 5,379,126 | 1/1995 | Seto et al. | 358/456 |
| 5,386,302 | 1/1995 | Kashihara et al. | 358/448 |
| 5,594,557 | 1/1997 | Rolleston et al. | 358/518 |
| 5,731,823 | 3/1998 | Miller | 347/5 |
| 5,828,780 | 10/1998 | Suzuki | 382/167 |

FOREIGN PATENT DOCUMENTS

| | | | |
|---|---|---|---|
| 0484900 A1 | 6/1991 | European Pat. Off. | H04N 1/40 |
| WO 91/02427 | 2/1991 | WIPO | H04N 1/46 |

*Primary Examiner*—Jerome Grant, II
*Attorney, Agent, or Firm*—Fitzpatrick, Cella, Harper & Scinto

[57] ABSTRACT

An image forming apparatus and method in which a controller is capable of executing image processing of its own are disclosed. The controller has an RF unit for processing image information, a halftone image processor, a density corrector and a patch generator. The engine includes a modulator corresponding to the RF unit, a halftone image processor different from that of the controller, a density controller, modulator and patch generator corresponding to the halftone processor of the engine, a sensor for sensing the density of formed patches, and a control unit for controlling the density of an image on the basis of a signal from the sensor. The engine sends the controller a signal relating to density control.

22 Claims, 18 Drawing Sheets

FIG. 17
SCANNING DIRECTION 
 1st. YELLOW PATCH
1st. MAGENTA PATCH
1st. CYAN PATCH
1st. BLACK PATCH
2nd. YELLOW PATCH
2nd. MAGENTA PATCH
2nd. CYAN PATCH
2nd. BLACK PATCH
3rd. YELLOW PATCH
3rd. MAGENTA PATCH
3rd. CYAN PATCH
3rd. BLACK PATCH
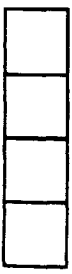 8th. YELLOW PATCH
8th. MAGENTA PATCH
8th. CYAN PATCH
8th. BLACK PATCH

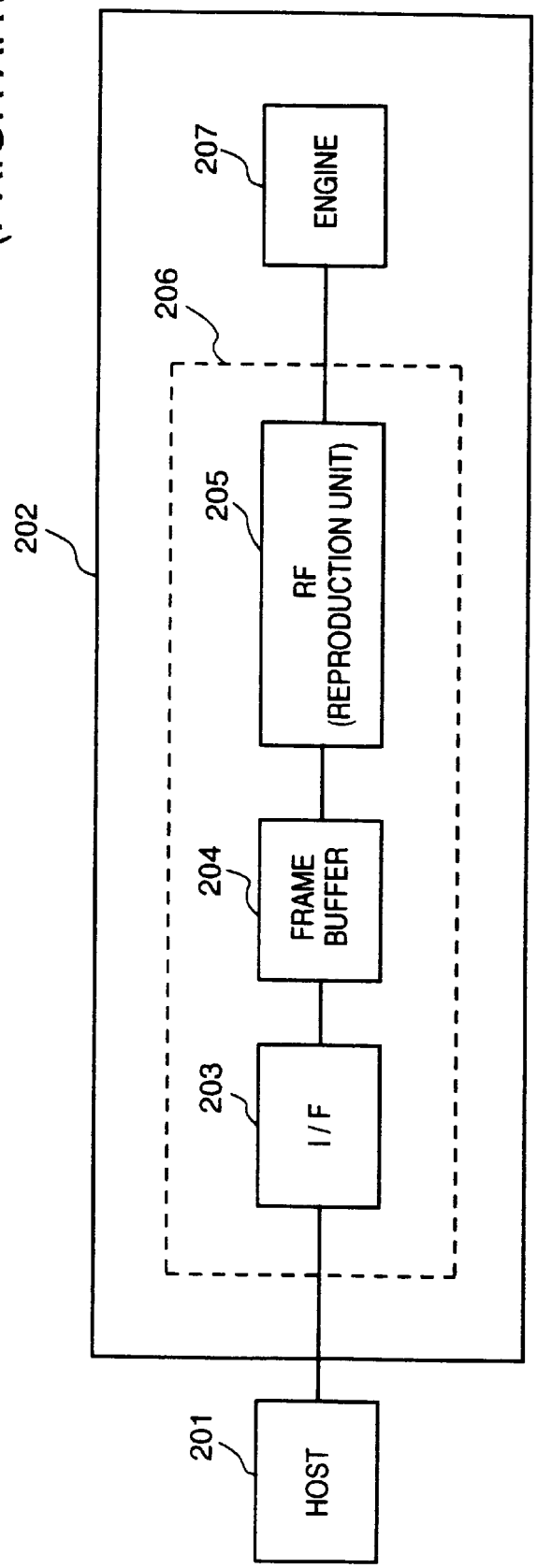

IMAGE PROCESSING METHOD, APPARATUS AND CONTROLLER

This a continuation of Ser. No. 08/426,275, filed Apr. 21, 1995, now abandoned.

BACKGROUND OF THE INVENTION

1. Field of the Invention

This invention relates to an image processing apparatus, method and controller for controlling density.

2. Description of the Related Art

FIG. 18 is a block diagram illustrating the construction of a printer apparatus according to the prior art. The printer proper, indicated at 202, is connected to a host computer (hereinafter referred to as a "host"), which is an information source of image information to be printed.

The printer 202 comprises a controller 206 and an engine 207, which receives print information outputted by the controller 206 and prints the data on recording paper. The controller 206 comprises an interface I/F 203 for connection to the host 201, a frame buffer 204 for retaining data, which has been transferred from the host 201, as image data to be printed, and a reproduction unit (hereinafter referred to as an "RF unit") 205, which subjects the output of the frame buffer 204 to masking and UCR processing to convert the output to a signal suited to the engine 207.

The printer 202 constructed as described above will now be described. Multivalued image data that has entered from the host 201 is applied to and retained in the frame buffer 204 via the interface 203. At the time of printing, the image data is read out of the frame buffer 204 in sync with the recording speed of the engine 207. The image data read out is converted by the RF unit 205 in conformity with the characteristics of the engine 207. By way of example, if the image input data has entered in the form of an RGB signal, the data is converted to a signal capable of being handled by the engine 207, namely YMCK four-color image data in a case where full-color printing is performed using the colors Y, M, C, K. At this time masking processing or UCR processing, which has been optimized for the process characteristics of the engine 207, namely the toner characteristics and development bias—density characteristic, is executed. The engine 207 prints out the image data that has undergone the aforesaid processing.

In this multivalued image recording apparatus, it is required that the relationship between the entering density-level signal and the density actually printed be linear, and it is necessary that he density printed be constant with respect to the same density-level signal regardless of temperature and humidity. In an electrophotographic printer, however, fluctuations in the toner characteristic and development bias—density characteristic make it difficult to maintain density linearity and consistency. In general, automatic density control for each of the colors Y. M, C, K is carried out in the engine.

The following problems are encountered in the prior art described above:

In the arrangement described above, the color conversion characteristics of masking and UCR in the RF unit 205 of the controller 206 must have one-to-one correspondence with the process characteristics of the engine 207. Consequently, when the controller 206 is developed, for example, the start of development must wait for settlement of the engine process characteristics, as a result of which the development period is prolonged. Furthermore, image processing functions inclusive of a color converting function cannot be added onto the controller, and therefore the manufactured product cannot be provided with additional value.

More specifically, in the engine 207 which has a construction independent of that of the controller 206, the density of the print image is fixed at a density characteristic which seems to be ideal. Accordingly, image processing carried out in the controller 206 before data is outputted to the engine 207 is not faithfully reflected in the final output image, and tones or colors that satisfy various user needs satisfactorily cannot be expressed.

SUMMARY OF THE INVENTION

An object of the present invention is to provide an image processing apparatus, method and controller in which the aforementioned drawbacks are eliminated.

Specifically, an object of the present invention is to generate optimum correction data by a controller unit.

According to the present invention, the foregoing object is attained by providing a controller unit for subjecting image data to a first correction on the basis of first correction data and transmitting the corrected image data to an image forming unit, the controller unit comprising bidirectional communication means for bidirectional communication with the image forming unit, and first generating means for generating the first correction data on the basis of data representing first patches, formed by the image forming unit, obtained by the bidirectional communication.

Further, an object of the present invention is to provide an image processing apparatus having a degree of freedom high enough to meet various user needs relating to image processing.

According to the present invention, the foregoing object is attained by providing an image processing apparatus having a controller unit for converting entered image information to a multivalued image signal, and an engine for forming an image on the basis of the multivalued image signal, wherein the controller unit includes image processing means for processing the image information and first density-control processing means for performing first density control processing automatically, and the engine includes image forming means for forming an image on the basis of the multivalued image signal and second density-control processing means for performing second density control processing automatically.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 17 is a diagram showing an example of formed patches; and

FIG. 18 is a diagram showing the construction of a printer according to the prior art.

DESCRIPTION OF THE PREFERRED EMBODIMENTS

Preferred embodiments of the present invention will now be described with reference to the drawings.

<First Embodiment>

Figure 13:
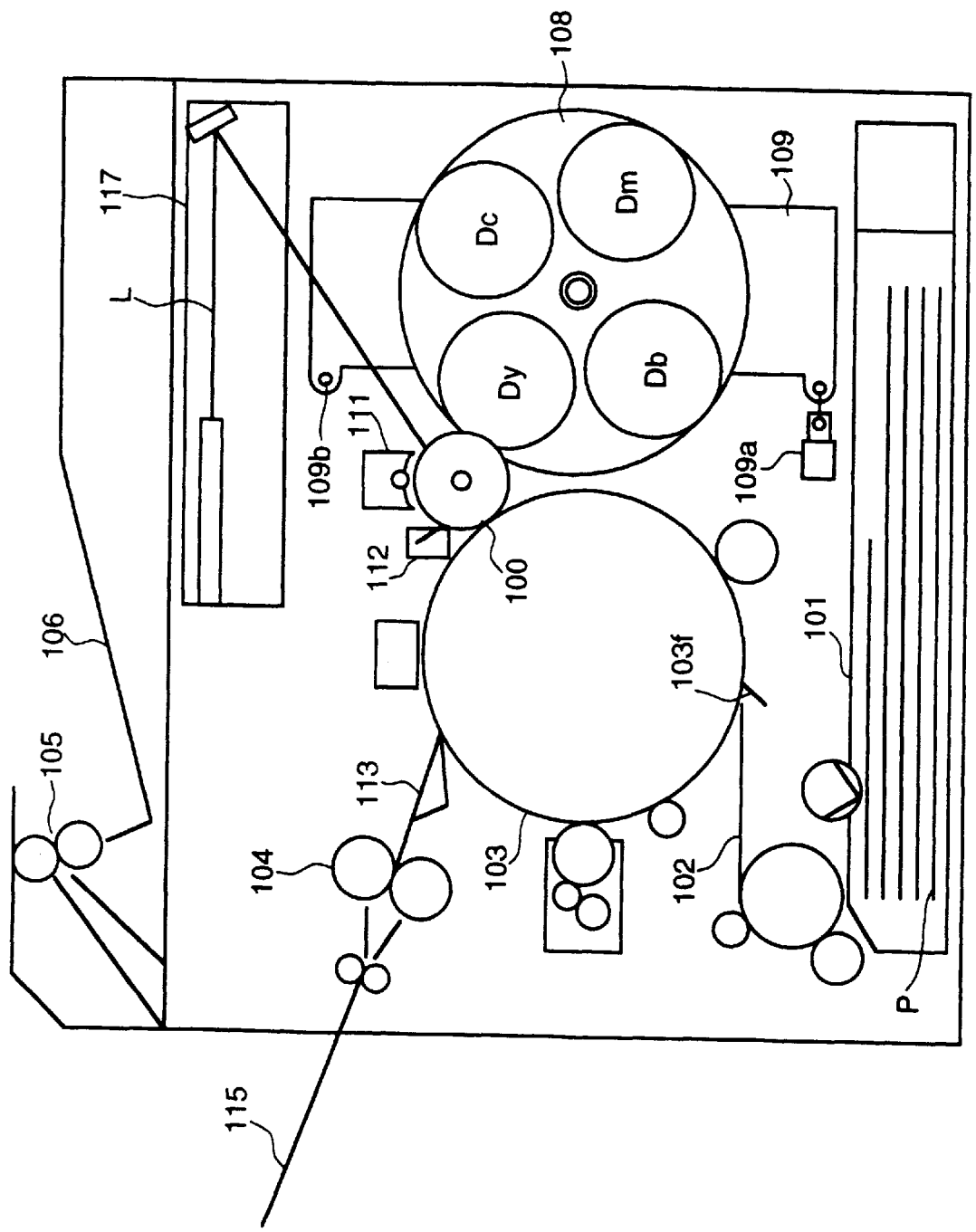
FIG. 13 is a sectional view showing an example of an image processing apparatus according to the present invention.

FIG. 13 illustrates the construction of a color LBP (laser-beam printer) according to an embodiment of the present invention. As shown in FIG. 13, transfer paper P fed from a paper feeder 101 is held on the outer periphery of a transfer drum 103 via a conveyance path 102 while its leading edge is gripped by a gripper 103*f*. Latent images formed for the respective colors on a photosensitive drum 100 by an optical unit 117 are developed by respective color developing units Dy, Dc, Db, Dm and are transferred a plurality of times to the recording paper on the outer periphery of the transfer drum 103, whereby a multicolored image is formed. Thereafter, the transfer paper P is peeled off the transfer drum 103 by a separating finger 113, the transfer paper undergoes fixing in a fixing unit 104 and the fixed transfer paper is discharged into a discharge tray 106 via a paper discharge unit 105 or discharged into a discharge tray 115.

Each of the color developing units Dy, Dc, Db, Dm has a rotary shaft supported at both ends. The developing units are held in a developing-unit selecting mechanism 108 so as to be capable of being rotated about their respective axes. The color developing units Dy, Dc, Db, Dm may be rotated, so that any one can be selected, while the attitude thereof is held fixed. The selected developing unit is moved to a developing position, after which the developing-unit selecting mechanism 108 is moved, together with a selecting-mechanism supporting frame 109, toward the photosensitive drum 100 about a fulcrum 109*b* by means of a solenoid 109*a*.

The operation of the color LBP constructed as set forth above will be described next.

First, the photosensitive drum 100 is uniformly charged to a prescribed polarity by a corona discharge unit 111, and the drum is exposed to a laser beam L to develop the latent image of, say, the color M (magenta) on the photosensitive drum 100, thereby forming a first toner image of the color M (magenta) on the drum 100. Meanwhile, the transfer paper P is supplied at a prescribed timing, a transfer bias voltage (e.g., +1.8 kV) having a polarity (positive, for example) opposite that of the toner is applied to the transfer drum 103, the first toner image on the photosensitive drum 100 is transferred to the transfer paper P and the transfer paper P is then electrostatically attracted to the surface of the transfer drum 103. The photosensitive drum 100 then has any residual toner of the color M removed by a cleaner 112 in order to prepare for the formation of the next latent image and the next development process.

Next, the second latent image, this time for the color C (cyan), is formed on the photosensitive drum 100 by the laser beam L, then the second latent image on the photosensitive drum 100 is developed by the developing unit Dc for C (cyan) to form a second toner image. The second toner image of the color C (cyan) is transferred to the transfer paper P at a position matching that of the first toner image of the color M (magenta). In this second transfer of the toner image, a bias voltage higher than that used at the time of the transfer of the first toner image is applied to the transfer drum 103 immediately before the transfer paper arrives at the transfer section. Similarly, third and fourth latent images for the colors Y (yellow) and K (black) are formed on the photosensitive drum 100 one after the other, these latent images are developed successively by the developing units Dy, Db, respectively, and third and fourth toner images of the colors Y (yellow) and K (black) are transferred one after the other to the transfer paper P at positions matching those of the toner images transferred earlier. Toner images of four colors are thus formed in a superimposed state. In these third and fourth transfers of the toner image, a bias voltage higher than that used at the time of the transfer of the second toner image is applied to the transfer drum 103 immediately before the transfer paper arrives at the transfer section.

The reason for thus raising the transfer bias voltage whenever the transfer of the image of each color is performed is to prevent a decline in the transfer efficiency. The chief cause of a decline in transfer efficiency is as follows: When the transfer paper is peeled off the photosensitive drum 100 after the transfer, the surface of the transfer paper is charged by gaseous discharge to a polarity opposite that of the transfer bias voltage (the surface of the transfer drum bearing the transfer paper also is charges slightly). Since the electric charge produced by this charging accumulates with every transfer, the transfer electric field declines with every transfer if the transfer bias voltage is kept fixed.

This embodiment is so adapted that when the leading edge of the transfer paper arrives at the transfer starting position (this includes a moment immediately before or immediately after arrival) in the fourth color transfer mentioned above, a DC bias voltage of the same polarity and potential as those of the transfer voltage applied at the time of the transfer of the fourth toner image is superimposed upon an AC voltage and the resulting voltage is impressed upon the corona discharge unit 111, thereby discharging the photosensitive drum 100. The reason for thus operating the corona discharge unit 111 when the leading edge of the transfer paper has arrived at the transfer starting position in the fourth color transfer is to prevent uneven transfer. In particular, in transfer of a full-color image, even the occurrence of slight transfer unevenness results in a conspicuous disparity in color.

Accordingly, it is required that a discharge operation be performed by applying the necessary bias voltage to the corona discharge unit 111 in the manner set forth above.

When the leading edge of the transfer paper P to which the toner image of the four colors have been transferred in superimposed form approaches the peel-off position, the separation finger 113 is made to approach this position and the tip of the finger is brought into contact with the surface of the transfer drum 103 to separate the transfer paper P from the transfer drum 103. The tip of the separation finger 113 is held in contact with the surface of the transfer drum and the finger is then separated from the transfer drum 103 and returned to its original position. The corona discharge unit 111 operates from the moment the leading edge of the transfer paper arrives at the final transfer starting position to the moment the trailing edge of the transfer paper departs from the transfer drum 103 and the accumulated charge on the transfer paper (which charge has a polarity opposite that of the toner) is removed to facilitate separation of the transfer paper by the separation finger 113 and to reduce the gaseous discharge at the time of separation. Furthermore, when the trailing edge of the transfer paper arrives at the transfer end position (the exit of a nipping portion formed by the photosensitive drum 100 and transfer drum 103), the transfer bias voltage applied to the transfer drum 103 is turned off (brought to ground potential). At the same, the bias voltage being impressed upon the corona discharge unit 111 also is turned off.

The separated transfer paper P is conveyed to the fixing unit 104, where the toner images on the transfer paper are fixed, whence the transfer paper is ejected into the paper discharge tray 115.

The foregoing is the printing process in the color LBP used in this embodiment.

Figure 1:
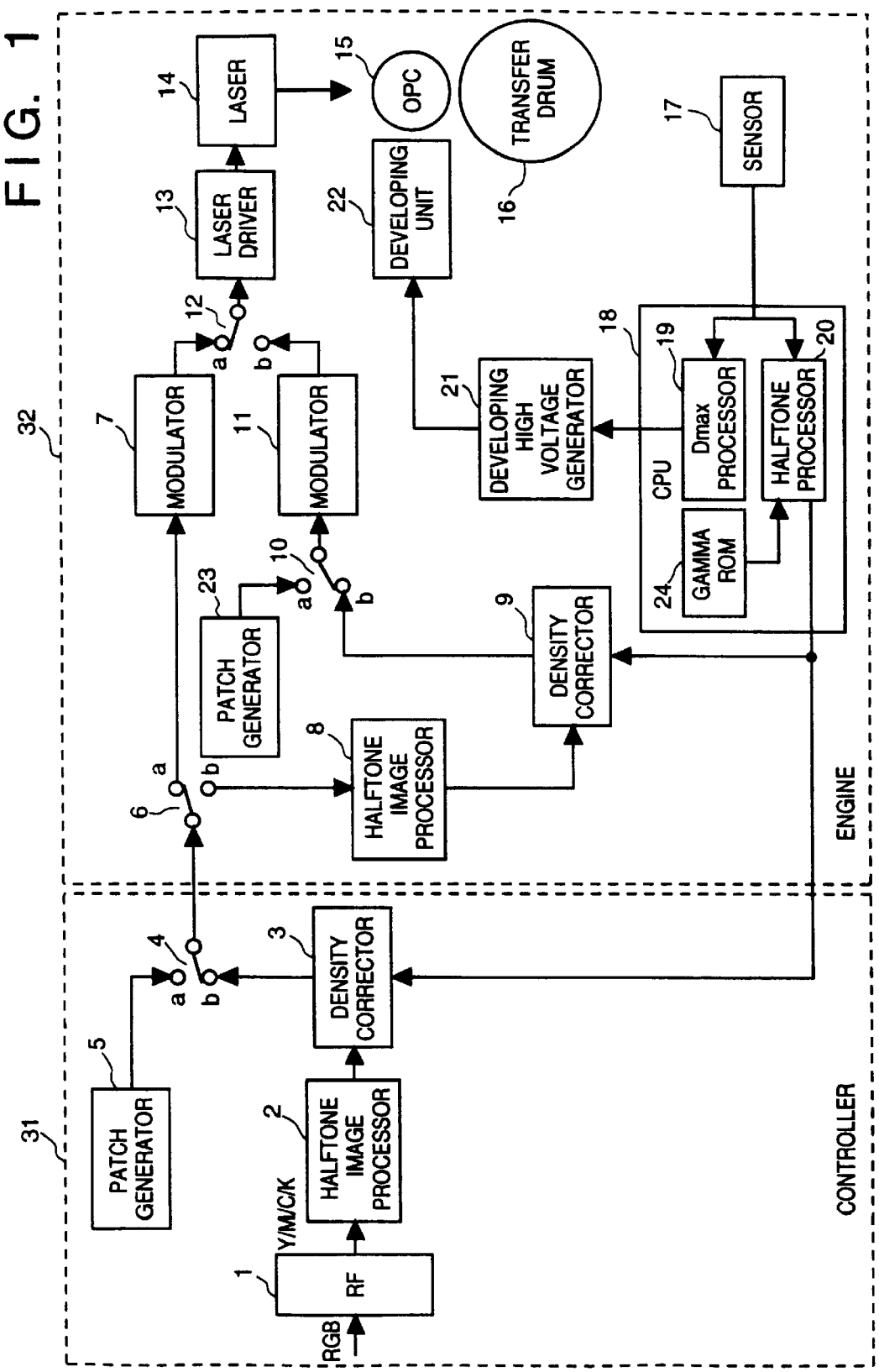
FIG. 1 is a block diagram illustrating an example of the arrangement of a controller and engine in an image forming apparatus embodying the present invention.
Figure 2:
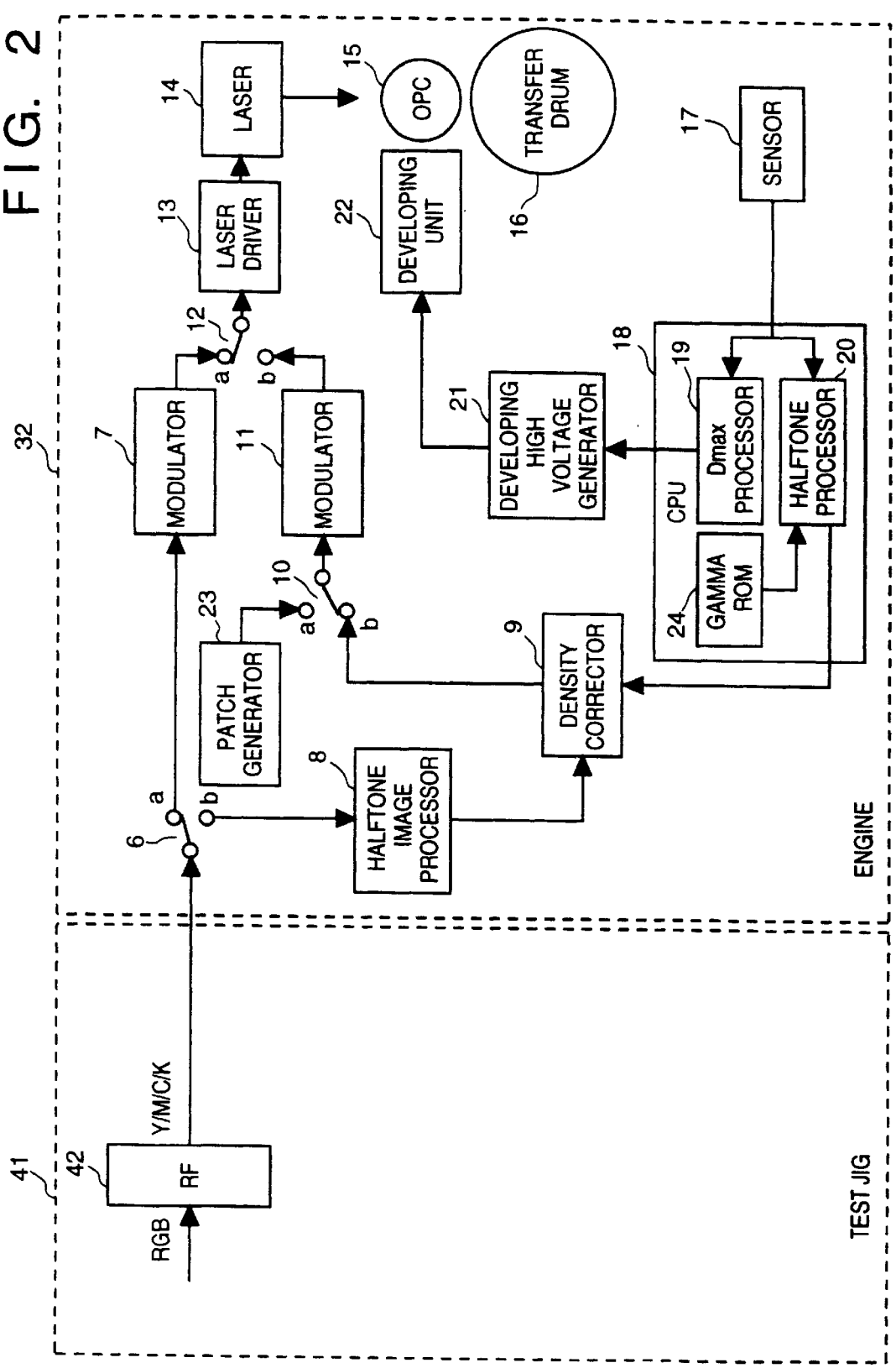
FIG. 2 is a block diagram showing a case in which the engine of FIG. 1 is evaluated.

FIG. 1 is a block diagram illustrating an example of the arrangement of a controller and engine in an image forming apparatus embodying the present invention, and FIG. 2 is a block diagram showing a case in which the engine of FIG. 1 is evaluated.

The overall configuration will be described first. In FIG. 1, numeral 31 denotes the controller and 32 the engine.

The controller 31 includes an RF unit 1 for performing color conversion processing such as masking and UCR, a first halftone image processor 2 the output of which is supplied to an input terminal b of a switch 4 via a first density corrector 3, and a first patch pattern generator 5 connected to an input terminal a of the switch 4. It is thus possible to switch between density control and printing.

The output of the switch 4 is supplied to a first modulator 7 via an output terminal a of switch 6 provided in the engine 32. The switch has another output terminal b connected to a second halftone image processor 8, the output of which is supplied to an input terminal b of a switch 10 via a second density corrector 9.

A second patch pattern generator 23 is connected to an input terminal a of the switch 10 so that it is possible to switch between density control and printing. The output of the switch 10 is applied to a second modulator 11. The output of the first modulator 7 and the output of the second modulator 11 are selectively applied to laser driver 13 by a switch 12.

Light emitted from a laser 14 is made to scan a photosensitive drum 15 by a scanner, not shown, thereby forming a latent image on the drum. The formed latent image is developed and is transferred either to a transfer drum 16 at the time of density control or to recorded paper, which has been wound upon the transfer drum 16, at the time of printing. The connections and arrangements of a density sensor 17, a Dmax processor 19 in a CPU 18, a developing high-voltage generator 21 and a developing unit 22 are similar to those of the prior art.

The output of a halftone processor 20 within the CPU 18 is applied to the second density corrector 9 of the engine 32 and to the first density corrector 3 of the controller 31.

In FIG. 2, numeral 41 denotes a test jig for evaluating the engine 32. The test jig 41 is provided with an RF unit 42 made to accommodate the engine process characteristics designated by the engine developer.

Before discussing operation, halftone image processing of the engine 32 and automatic density control corresponding to this processing will be described.

As shown in FIG. 2, a designated YMCK signal obtained by the RF unit 42 mounted on the test jig 41 is sent to the engine 32 field-sequentially as multivalued image data of, say, 200 lines. This signal is applied to the halftone image processor 8 via the contact b of the switch 6. The halftone image processor 8 performs superpixel processing for halftone printing of 200 lines, the output of the processor 8 is supplied to the modulator 11 via the density corrector 9 and switch 10, and the output of the modulator 11 is supplied to the laser driver 13 via the contact b of the switch 12. The modulator 11 is a central-growth pulse-width modulator in which growth occurs from the center of pixels in correspondence with 200 lines of superpixels.

Figure 3:
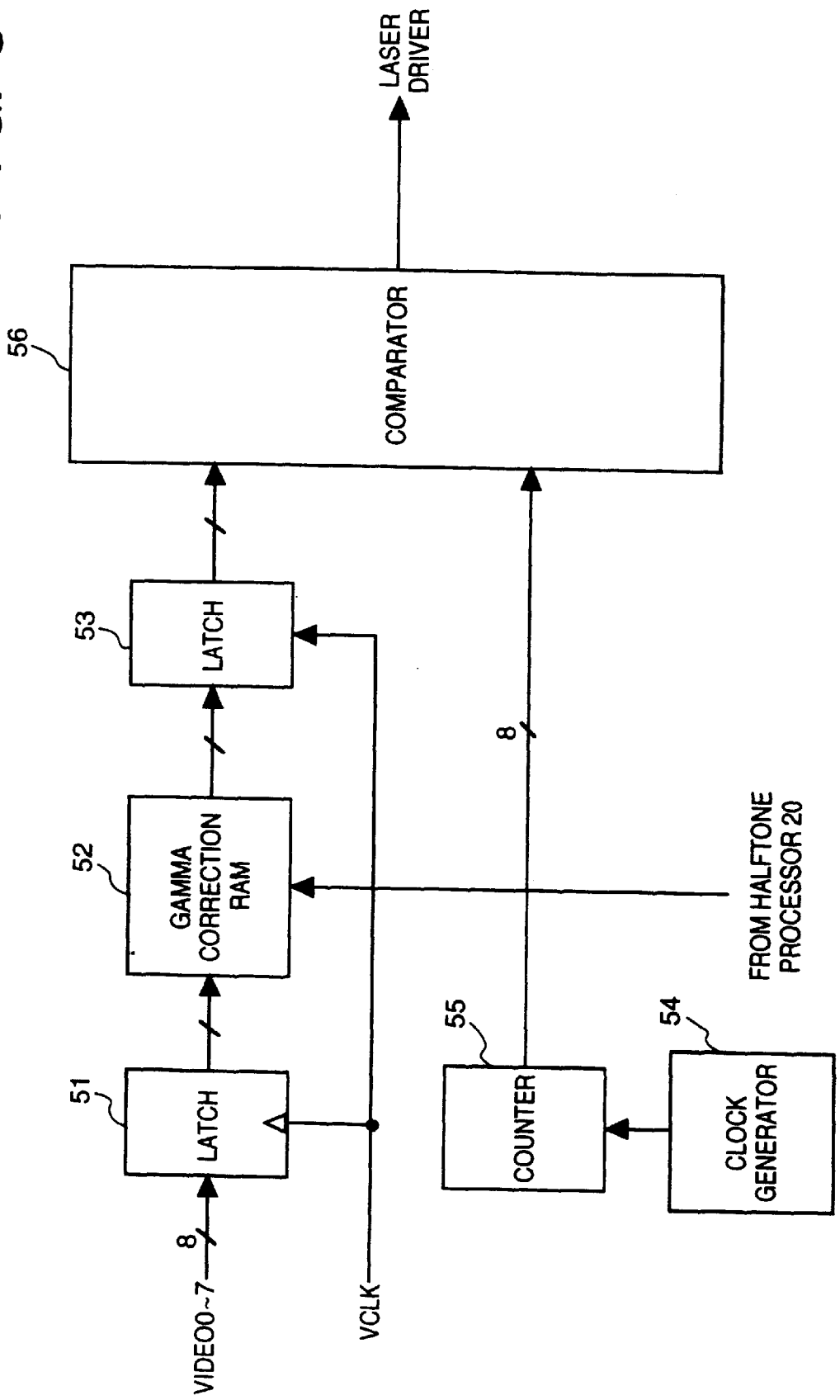
FIG. 3 is a block diagram illustrating an example of the detailed arrangement of a halftone image processor, a density correcting unit and a modulator in FIG. 1.

FIG. 3 is a block diagram illustrating an example of the detailed arrangement of the halftone image processor 8, a density corrector 9 and modulator 11.

Multivalued image data Video 0~7 of, say, eight bits, outputted by the test jig 41 is latched in a latch 51 synchronized to an image clock VCLK. In a case where simple 200-line printing is carried out, only this latch suffices for image processing. However, processing such as edge emphasis, not illustrated, may also be executed.

A gamma-correction RAM 52 outputs image data obtained by subjecting the above-mentioned image data to a density correction by correction data from the halftone processor 20, described later. The image data corrected for density is latched in a latch 53 synchronized to VCLK.

Figure 4:
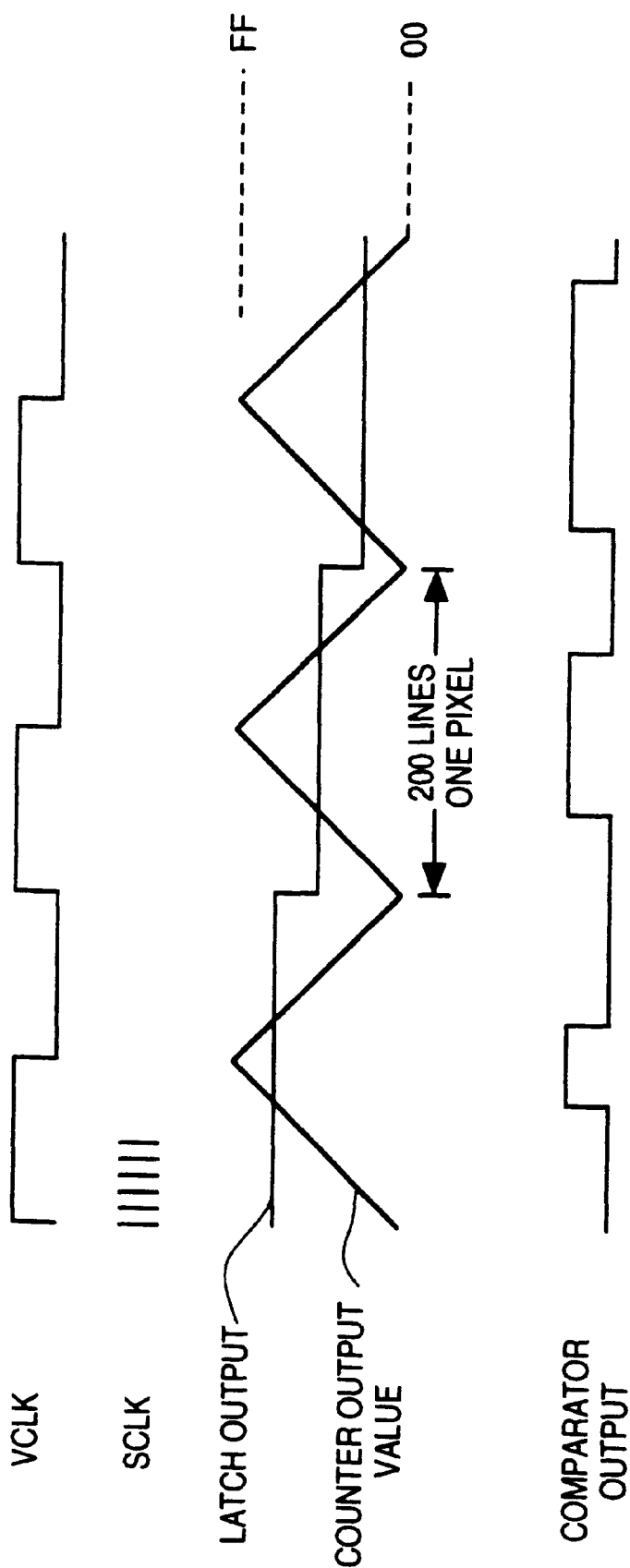
FIG. 4 is a waveform diagram showing an example of the output of a counter.

A clock generator 54 generates a clock signal SCLK having a frequency that is 512 times that of the image clock VCLK. A counter 55 counts the clock signal SCLK up or down. More specifically, since one input pixel has 256 gray levels, the counter counts up by 256 and then down by 256 in one period of the image clock VCLK. As a result, the output of the counter is a triangular wave ranging between "00" and "FF", as shown in the example of FIG. 4.

A comparator 56 compares the outputs of the latch 53 and counter 55, thereby pulse-width modulating the image data after it is gamma-corrected. The laser driver 13 drives the laser 14 in dependence upon this pulse-width modulated signal, thereby forming dots which grow from the centers of pixels so that a halftone image can be reproduced.

Density control will be described next. The density control is executed before actual printing takes place. Dmax control will be described first.

Patch data having a prescribed shape created on the basis of a Dmax-control patch pattern that has been stored in the patch pattern generator 23 for the purpose of Dmax control is formed, as a latent image of a plurality of patch patterns, on the outer peripheral surface of the photosensitive drum 15 by the laser 14 through the intermediary of the contact a of switch 10, the pulse-width modulator 11 and the laser driver 13.

The Dmax-control patch pattern has several gray levels in the vicinity of maximum density for each color corresponding to the recording paper.

Next, the developing high-voltage generator 21 generates developing bias at a plurality of levels, which vary in stepwise fashion, in correspondence with the number of patch patterns, whereby the above-mentioned latent image is visualized by the developing unit 22. This visual image is transferred to the recording paper on the transfer drum 16, and the density of the patch pattern corresponding to the developing bias is measured by the density sensor 17. The Dmax processor 19 in the CPU 18 subjects the measurement data to interpolation processing, calculates developing bias, at which maximum density is obtained, from the developing-bias—image density characteristic obtained, and sets a developing bias on the basis of the results of calculation, thereby holding the maximum density constant.

It should be noted that Dmax control may be adapted to control other process conditions such as corona discharge voltage and fixing temperature. When the Dmax control is completed, halftone control is executed.

Figure 5:
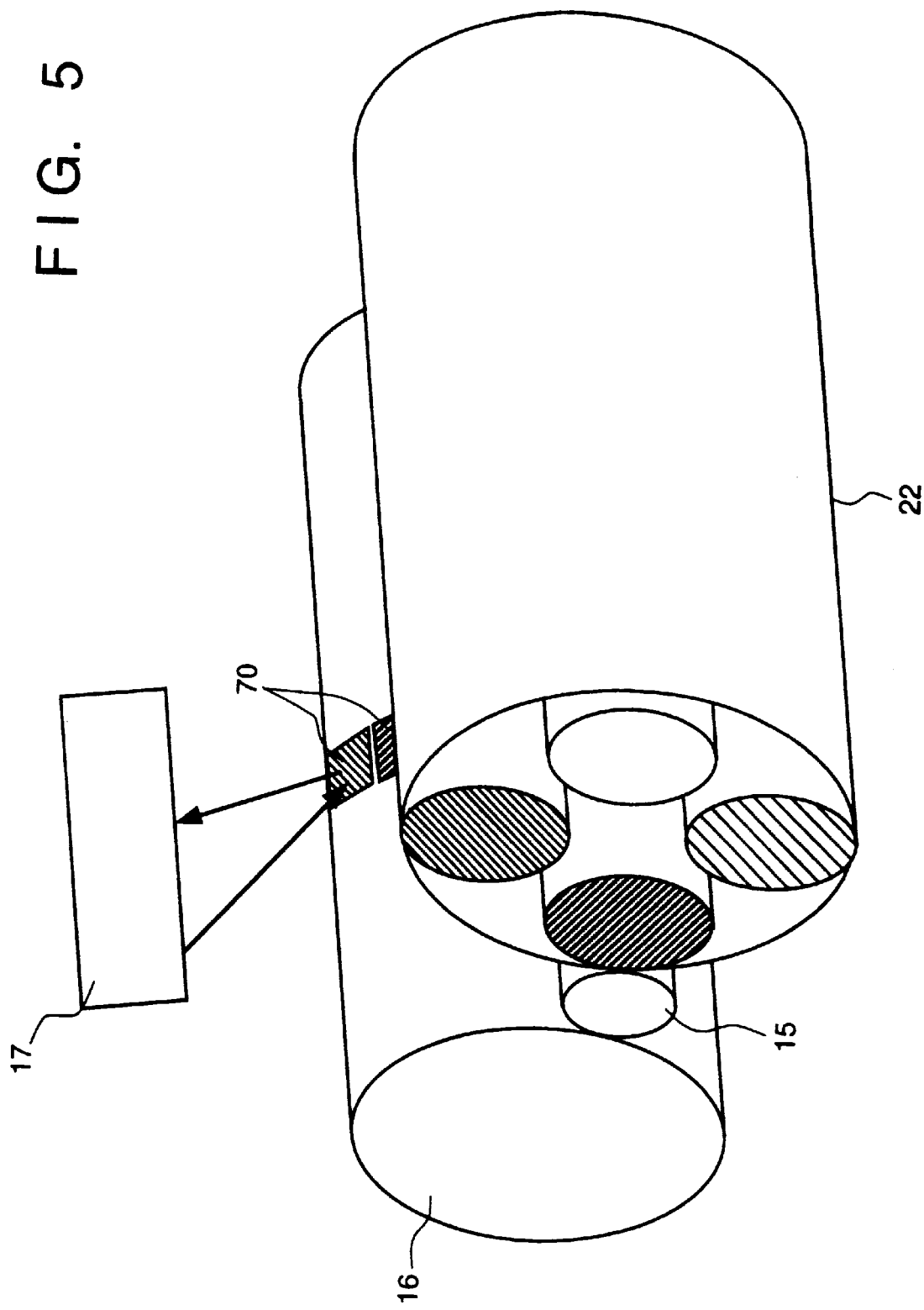
FIG. 5 is a diagram for describing patch formation on a transfer drum in FIG. 1.
Figure 6:
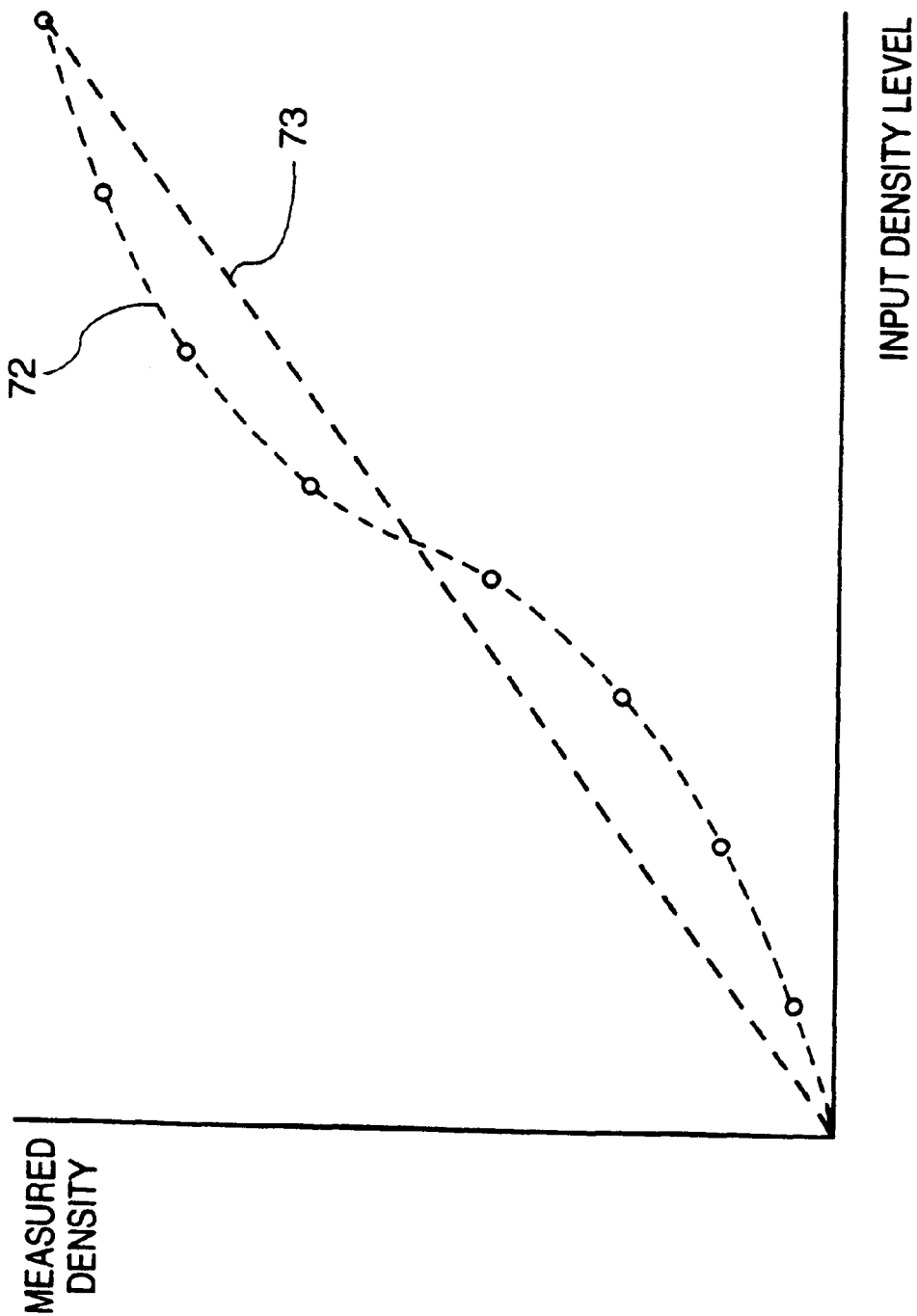
FIG. 6 is a graph showing an example of a density characteristic obtained by measuring a patch pattern.
Figure 12:
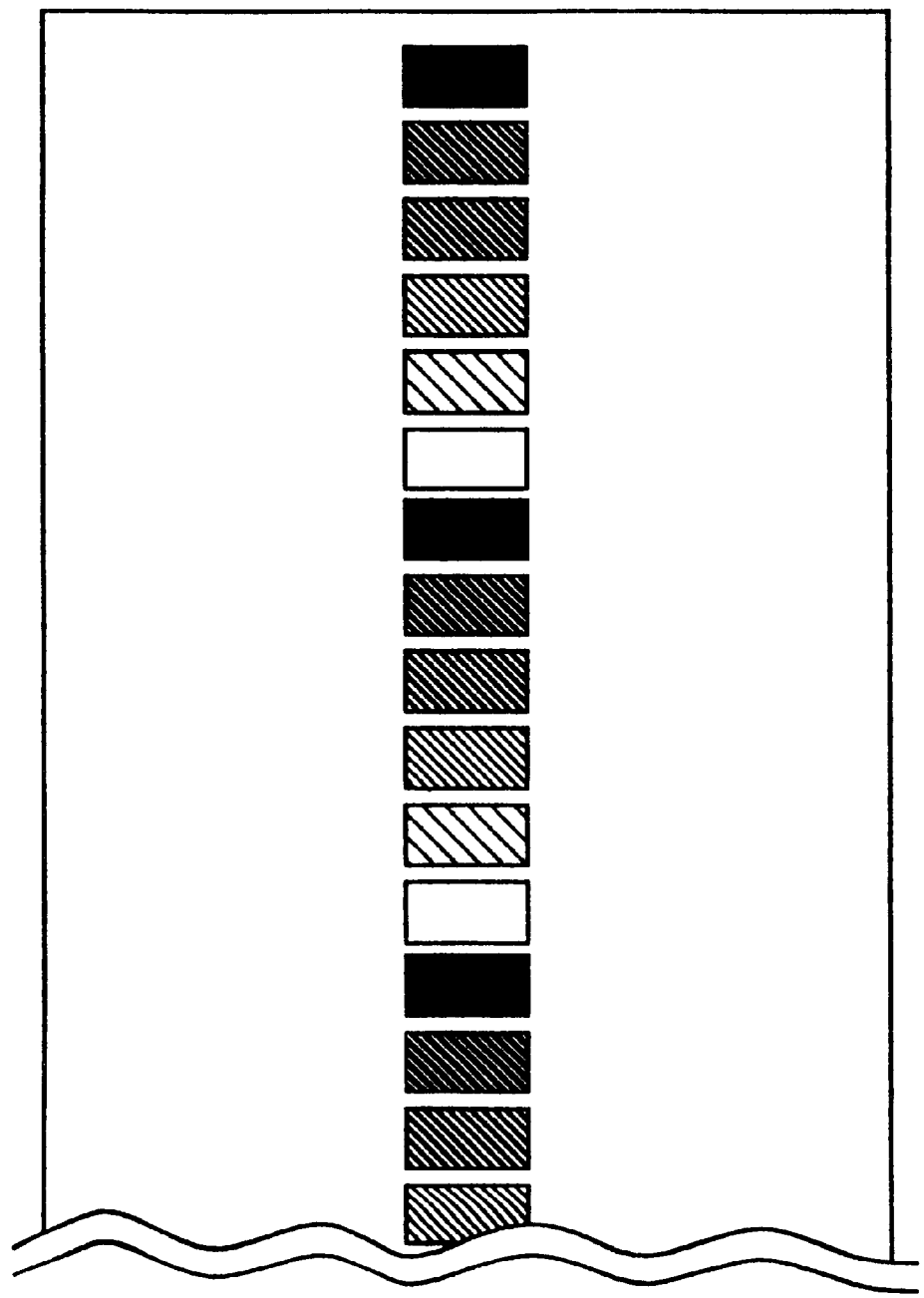
FIG. 12 is diagram showing an example of formed patches.

FIG. 5 is a diagram illustrating patch formation on the transfer drum 16. FIG. 12 is a diagram illustrating the patches formed. Eight patch patterns 70 having a plurality of density levels for each color, which patterns have been generated on the basis of patch patterns for halftone control stored in the patch generator 23, are used to form a latent image on the photosensitive drum 15 in the same manner as in Dmax control. However, the latent image is visualized by the developing unit 22 while the developing bias is maintained at a prescribed value, and this image is transferred to the recording paper on the transfer drum 16. The transferred plurality of patch patterns each have their color density measured by the density sensor 17, and the resulting data is processed by the halftone processor 20 within the CPU 18. The halftone processor 20 obtains a density characteristic, an example of which is indicated at 72 in FIG. 6, by interpolation processing based upon the eight items of data. In a case where the obtained density characteristic 72 is far removed from a target characteristic 73, the halftone processor 20 calculates correction data by referring to a gamma table stored in a gamma ROM 24 and stores the correction data in the gamma correction RAM 52. The output data in the latch 51 is corrected by this correction data. It should be noted that density control performed by the engine, namely Dmax control and halftone control, is carried out on the basis of control by the CPU 18 within the engine when the power supply starts up or periodically, by way of example. Furthermore, the gamma data is data for absorbing a density difference between the density detection point (the transfer drum 16) and the actual fixed image as well as a density difference caused by the environment. The environment mentioned here refers to temperature and/or humidity. Accordingly, a sensor for sensing temperature and/or humidity is provided within the engine and the output of the sensor is delivered to the controller.

Printing and density control with regard to halftone image processing performed by the controller 31 will now be described.

In FIG. 1, any YMCK signal obtained by the RF unit 1 is supplied field-sequentially to the halftone image processor 2 as multivalued image data of, say, 600 lines. The halftone image processor 2 forms superpixels by grouping each of the pixels, which are in units of 600 lines, every three pixels in the main-scan direction and supplies these to the density corrector 3 as six-bit image data and two-bit position information pixel by pixel. The output of the density corrector 3 is supplied to the engine 32 via the switch 4. At the time of actual printing, the switch 4 is connected to the b side and the switch 6 is connected to the a side. Accordingly, the above-mentioned image data and position information are supplied to the modulator 7, whence the data and information are delivered to the laser driver 13 via the contact a of switch 12.

The modulator 7 is a pulse-width modulator which, on the basis of, say, two-bit position information, is capable of selectively subjecting each pixel of 600 lines to central-growth pulse-width modulation in which pixels grow from the center thereof, left-growth pulse-width modulation in which pixels grow from the left side, and right-growth pulse-width modulation in which pixels grow from the right side.

Figure 7:
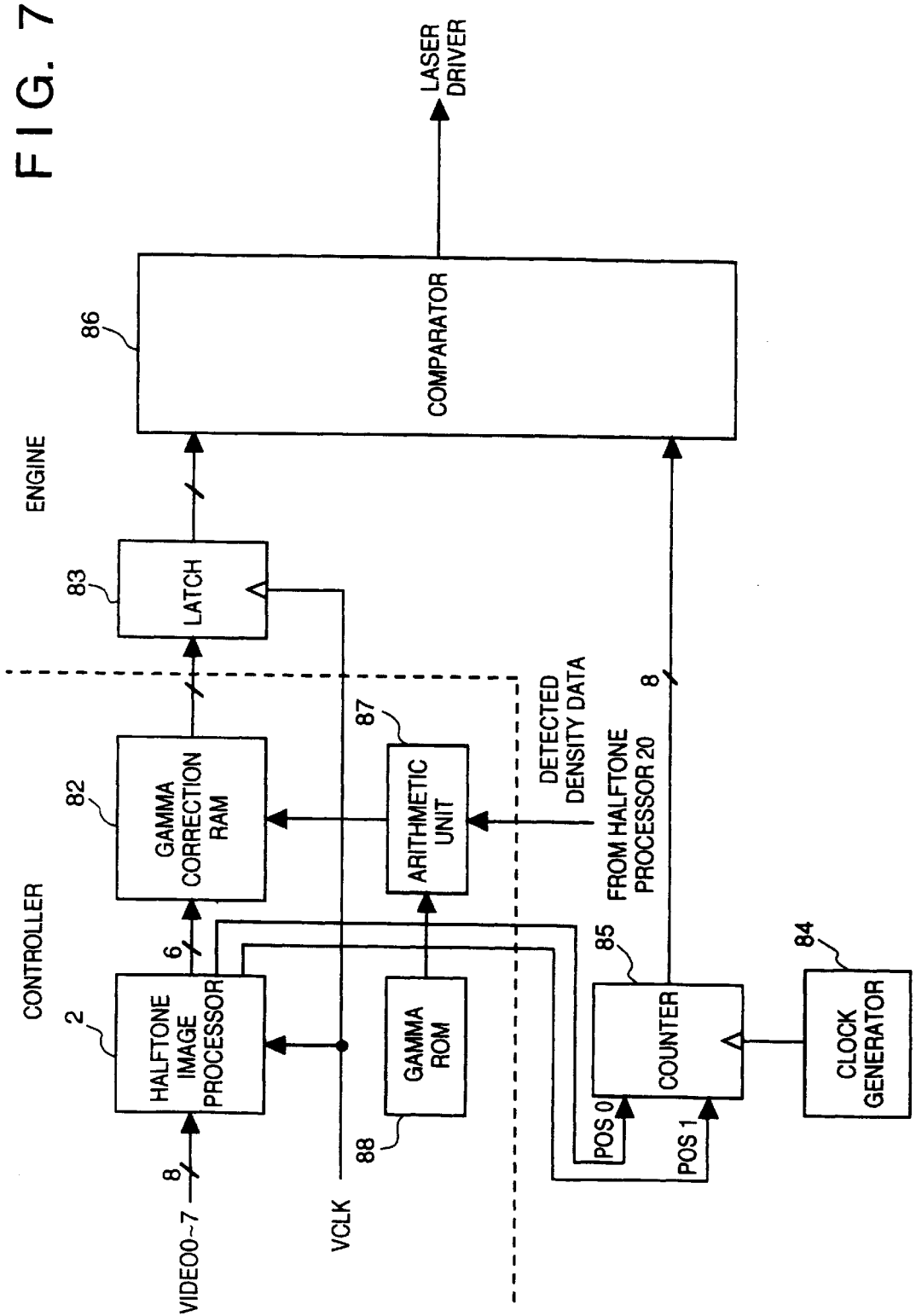
FIG. 7 is a block diagram illustrating an example of a detailed arrangement of a halftone image processor, a density correcting unit and a modulator in FIG. 1.

FIG. 7 is a block diagram illustrating an example of a detailed arrangement of the halftone image processor 2, density corrector 3 and modulator 7. Switches are not necessary in this description of operation and therefore are not shown.

The multivalued image data Video 0~7 of, say, eight bits from the RF unit 1 is converted to six-bit data and two-bit position information Pos0, Pos1 of each pixel by the halftone image processor 2. The six-bit data of each pixel is applied to gamma correction RAM 82, and the two-bit position information Pos0, Pos1 is applied to a counter 85 in the engine 32. The gamma correction RAM 82 outputs six-bit image data obtained by subjecting the entered six-bit data to a density correction using correction data from an arithmetic unit 87, described later. The image data whose density has been corrected is latched in a latch 83 synchronized to VCLK.

Figure 8:
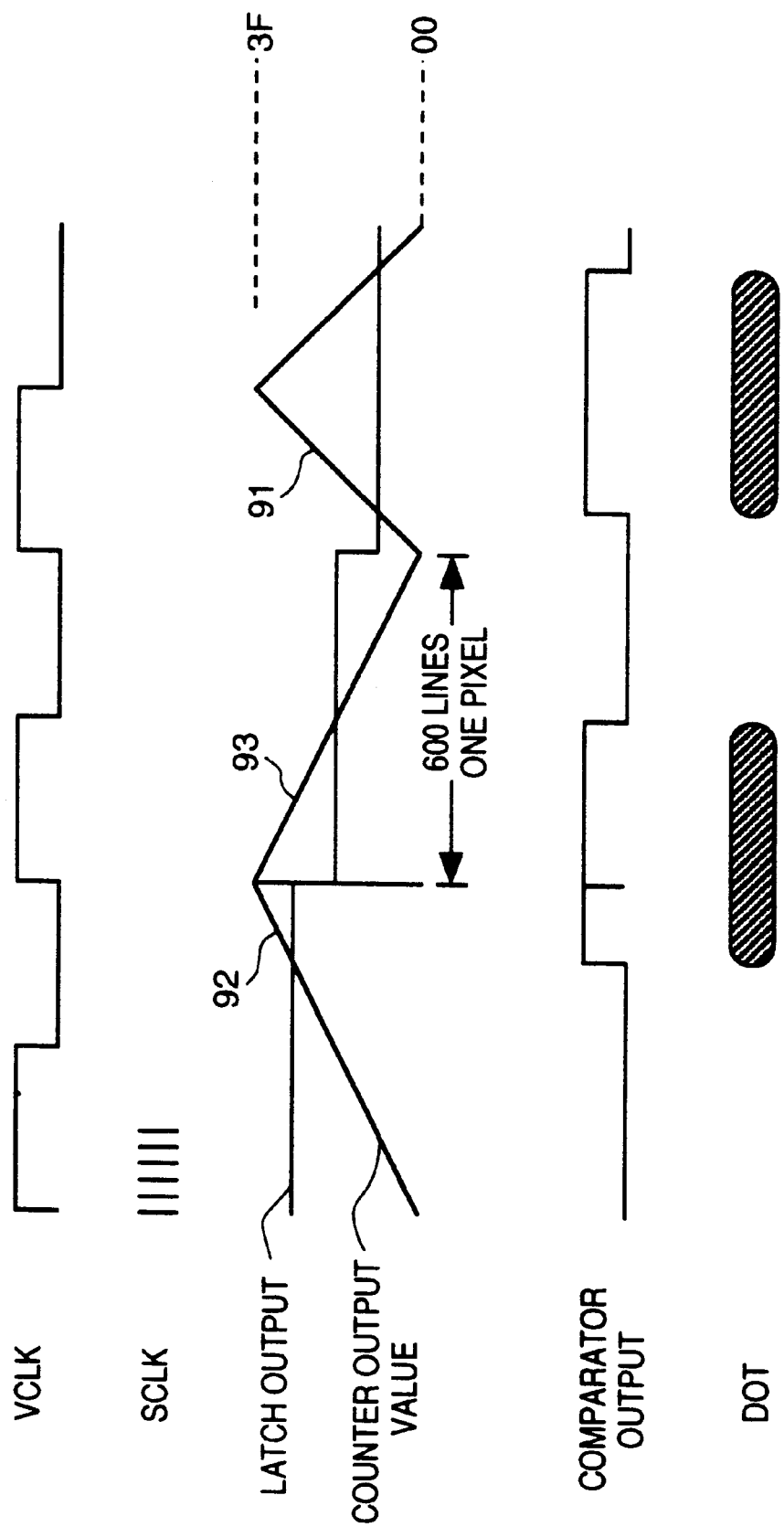
FIG. 8 is a waveform diagram showing an example of the output of a counter.

A clock generator 84 generates a clock signal SCLK whose frequency is 128 times that of the image clock signal VCLK. A counter 85 counts the clock signal SCLK up or down. More specifically, since one input pixel has 64 gray levels, the counter counts up by 64 and then down by 64 in one period of the image clock VCLK in accordance with the position information signals Pos0, Pos1. As a result, the output value of the counter is a triangular wave 91 ranging between "00" and "3F", as shown in the example of FIG. 8. Further, a sawtooth waveform 92 which rises to the right and a sawtooth waveform 93 which decays to the right can also be generated by an up-count every two clocks.

A comparator 86 compares the outputs of the latch 83 and counter 85, thereby pulse-width modulating the image data after it is gamma-corrected. The laser driver 13 drives the laser 14 in dependence upon this pulse-width modulated signal. As a result, dots which grow from the centers of pixels, dots which grow from the left side of pixels or dots which grow from the right side of pixels can be formed selectively depending upon the position information, thus making is possible to form a halftone.

Density control will be described next. Density control is performed in a manner similar to that set forth above. Eight patch patterns 70, which have been generated by the patch generator 5, are formed for each color on the transfer drum 16 by a sequence already described. Moreover, the patch pattern data for 600 lines generated by the patch generator 5 is transmitted to the first modulator 7 via the input terminal a of the switch 4 and the output terminal a of the switch 6, thereby the modulator 7 modulates the patch data. Here there are cases in which the patch pattern data takes on different values because the halftone image processing is different from that of the method described above. The patch patterns each have their color density measured by the density sensor 17, and the resulting data is processed by the halftone processor 20 within the CPU 18. The halftone processor 20 obtains a density characteristic, an example of which is indicated at 72 in FIG. 6, by interpolation processing based upon the eight items of data. This is set to the density corrector 3 of the controller 31 as density data. There are cases in which these characteristics also differ from those of the foregoing method.

In a case where the received density characteristic is far removed from the target characteristic, the arithmetic unit 87 calculates correction data by referring to a gamma table stored in a gamma ROM 88 and stores the correction data in the gamma correction RAM 82. The output data of the halftone image processor 2 is corrected by this correction data.

In accordance with this embodiment, as described above, the developer of the engine initiates automatic density control, which is brought to conclusion within the engine, premised on image processing inside the engine, and performs evaluation based upon a multivalued image signal from the RF unit made to correspond to the process characteristics of the engine. As a result, it is possible to provide a printer in which engine quality can be assured and which employs a controller mounting the designated RF unit.

Further, the developer of the controller is capable of providing the controller with functions of its own by performing automatic density control spanning the controller and the engine, using the density detection signal from the engine, on the condition of image processing within the controller.

Furthermore, by using the density measurement signal generated by the controller and the density information from the engine, the developer of the controller may ascertain the process characteristics of the engine, thereby making it possible to raise the degree of freedom and shorten development time.

Further, control of density is not performed merely by a fixed method but by using a controller on the basis of a prescribed image pattern that has been subjected to image processing. As a result, image density characteristics to be adjusted are not fixed and image formation can be carried out based upon optimum density characteristics flexibly conforming to the user needs. This makes it possible to obtain a high-quality output image under various environmental condition or in image processing methods.

[Modification]

An image forming apparatus according to a modification of the first embodiment will now be described. It should be noted that components substantially similar to those of the first embodiment are designated by like reference characters and a detailed description thereof is omitted.

Figure 9:
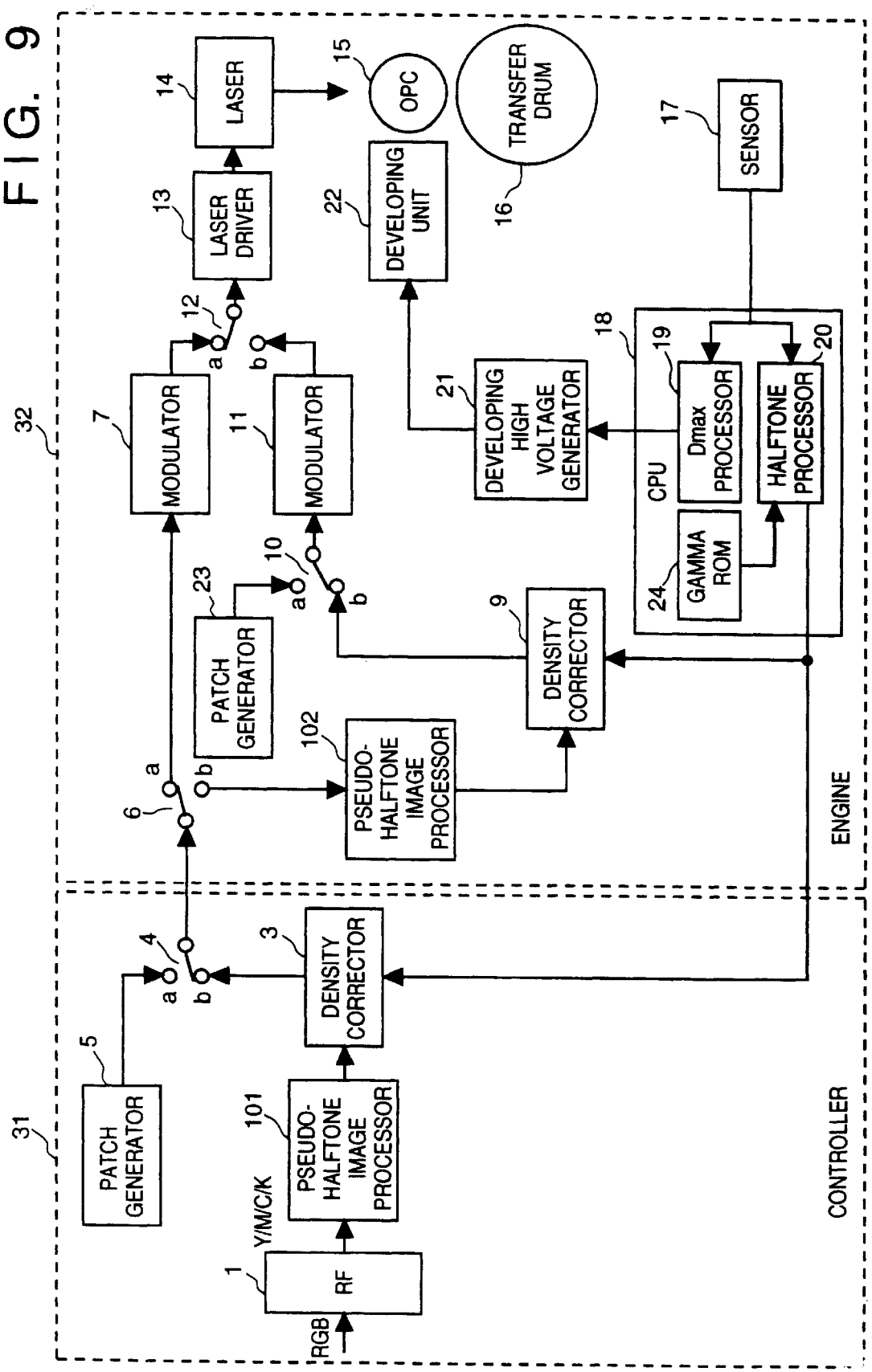
FIG. 9 is a block diagram showing an example of an arrangement according to a modification of the present invention.

FIG. 9 is a block diagram showing an example of an arrangement according to a modification of the present invention.

Here the controller 31 includes a first pseudo-halftone processor 101 for executing image processing by the dither method, for example, and the engine 32 includes a second pseudo-halftone processor 102 for executing image processing by the error diffusion method, for example. Accordingly, the first density corrector 3 and first modulator 7 are optimized for the dither method, and the second density corrector 9 and second modulator 11 are optimized for the error diffusion method.

By adopting this arrangement, it is possible to provide a printer optimized for the dither method desired by the controller developer and the error diffusion method desired by the engine developer.

Further, not only pseudo-halftones but also a binary image may be subjected to smoothing by the controller 31 and edge emphasis by the engine 32. Furthermore, types of image processing inclusive of the processing of the first embodiment may be combined freely.

An image forming apparatus according to another modification will now be described. It should be noted that components substantially similar to those of the first embodiment are designated by like reference characters and a detailed description thereof is omitted.

Figure 10:
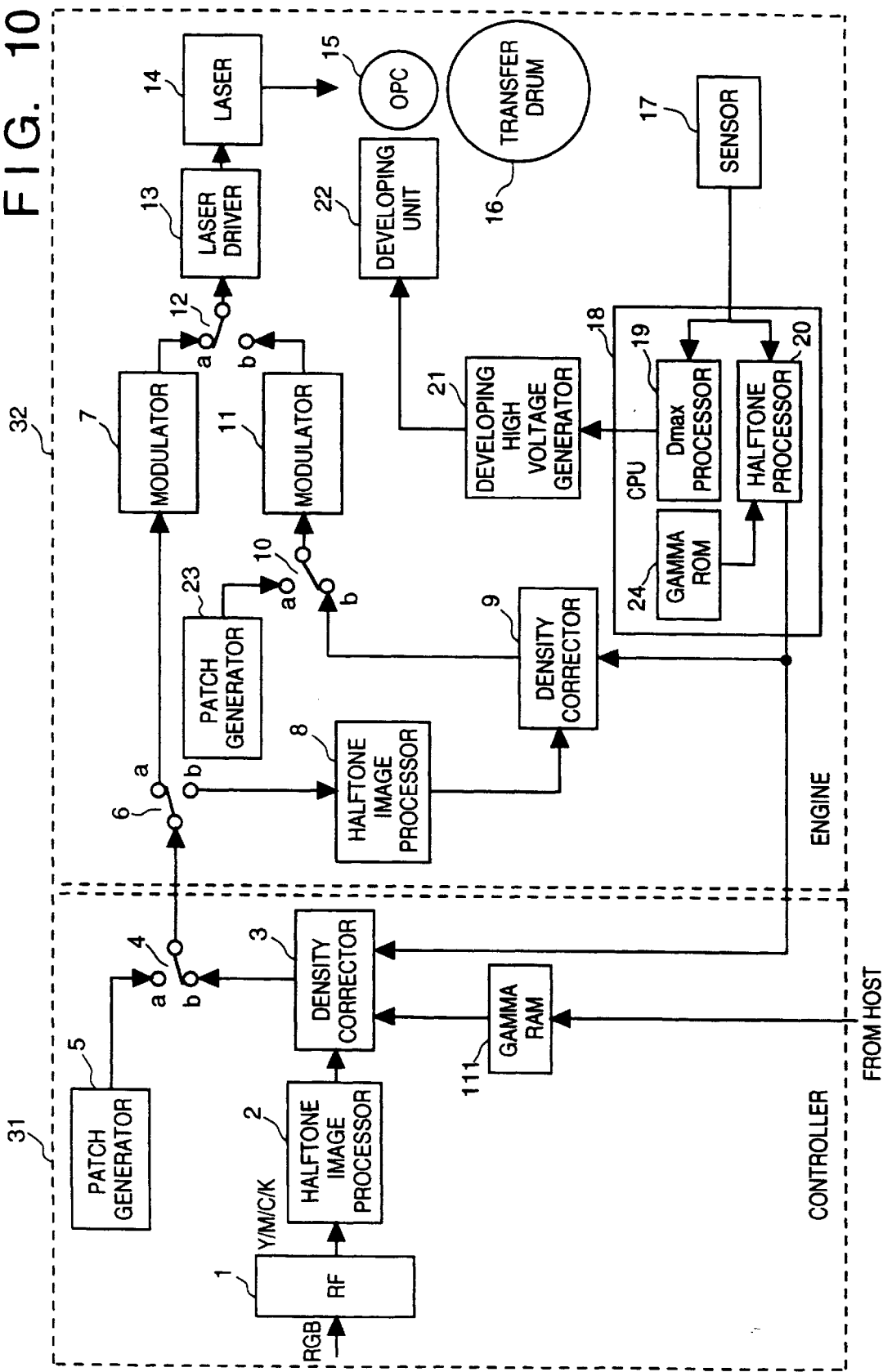
FIG. 10 is a block diagram showing an example of an arrangement according to a modification of the present invention.

FIG. 10 is a block diagram showing an example of an arrangement according to another modification of the present invention. Here the controller 31 has a gamma RAM 111 instead of the gamma ROM in order to download a gamma table from a host computer or the like.

By adopting this arrangement, the controller developer can deal rapidly with updating of version of the engine 31.

An image forming apparatus according to a modification of the present invention will now be described with reference to FIG. 11. It should be noted that components substantially similar to those of the first embodiment are designated by like reference characters and a detailed description thereof is omitted.

Figure 11:
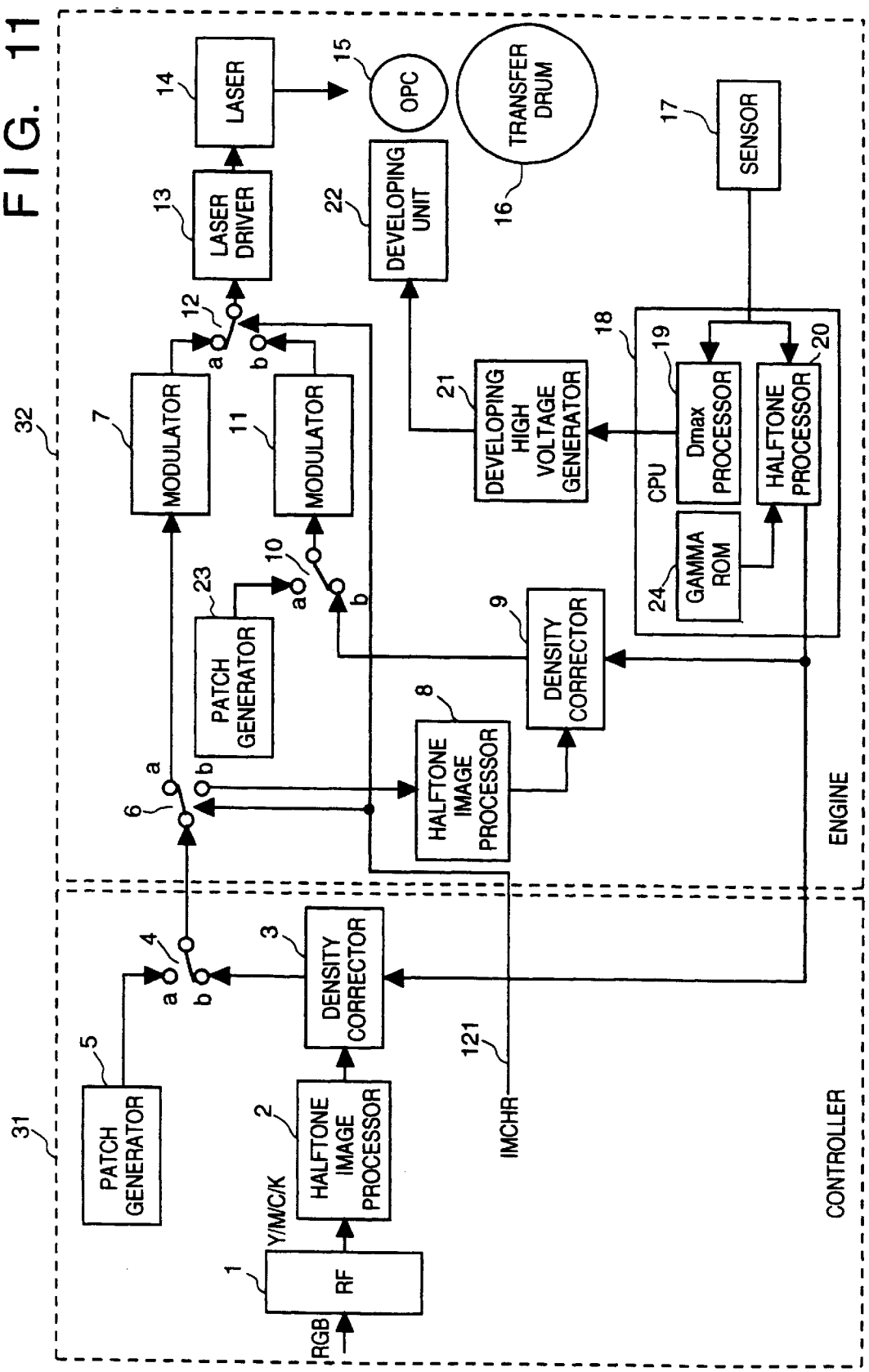
FIG. 11 is a block diagram showing an example of an arrangement according to a modification of the present invention.

FIG. 11 is a block diagram showing an example of an arrangement according to the modification. Here the switches 6 and 12 are changed over every pixel by a signal IMCHR 121 showing the attributes of an image.

By adopting this arrangement, data such as character data in which resolution is of special importance is pulse-width modulated by a 600-line modulator, and data such as photographic data in which tonality is of special importance is pulse-width modulated by a 200-line modulator, thereby forming an image. As a result, the image quality of the overall image can be improved by utilizing two modulators effectively.

In the foregoing embodiment and modifications, patch data from a patch generator does not undergo corresponding image processing. However, the patch data can be sent through an image processor as a matter of course.

Further, in accordance the embodiment and modifications described above, the controller also is capable executing image processing of its own. As a result, a variety of controllers can be made to accommodate one type of engine so that a greater variety of printers can be used. In addition, printing quality can be improved by effectively using two modulators made to accommodate the image processing of each of the controller and engine units.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the first embodiment and modifications thereof, there are provided an image forming apparatus and method in which a controller is capable of executing image processing of its own. This makes it possible to solve the problem of prolonged development time, the problem wherein image processing functions inclusive of color conversion cannot be added on freely, and the problem wherein engine quality cannot be assured in a case where image processing functions are allowed to be added on freely.

<Second Embodiment>

A second embodiment of the invention will now be described with reference to the drawings.

In the second embodiment, components and operations similar to those of the first embodiment are designated by like reference characters and need not be described again.

The following description relates to density control based upon control performed by the controller.

Figure 14:
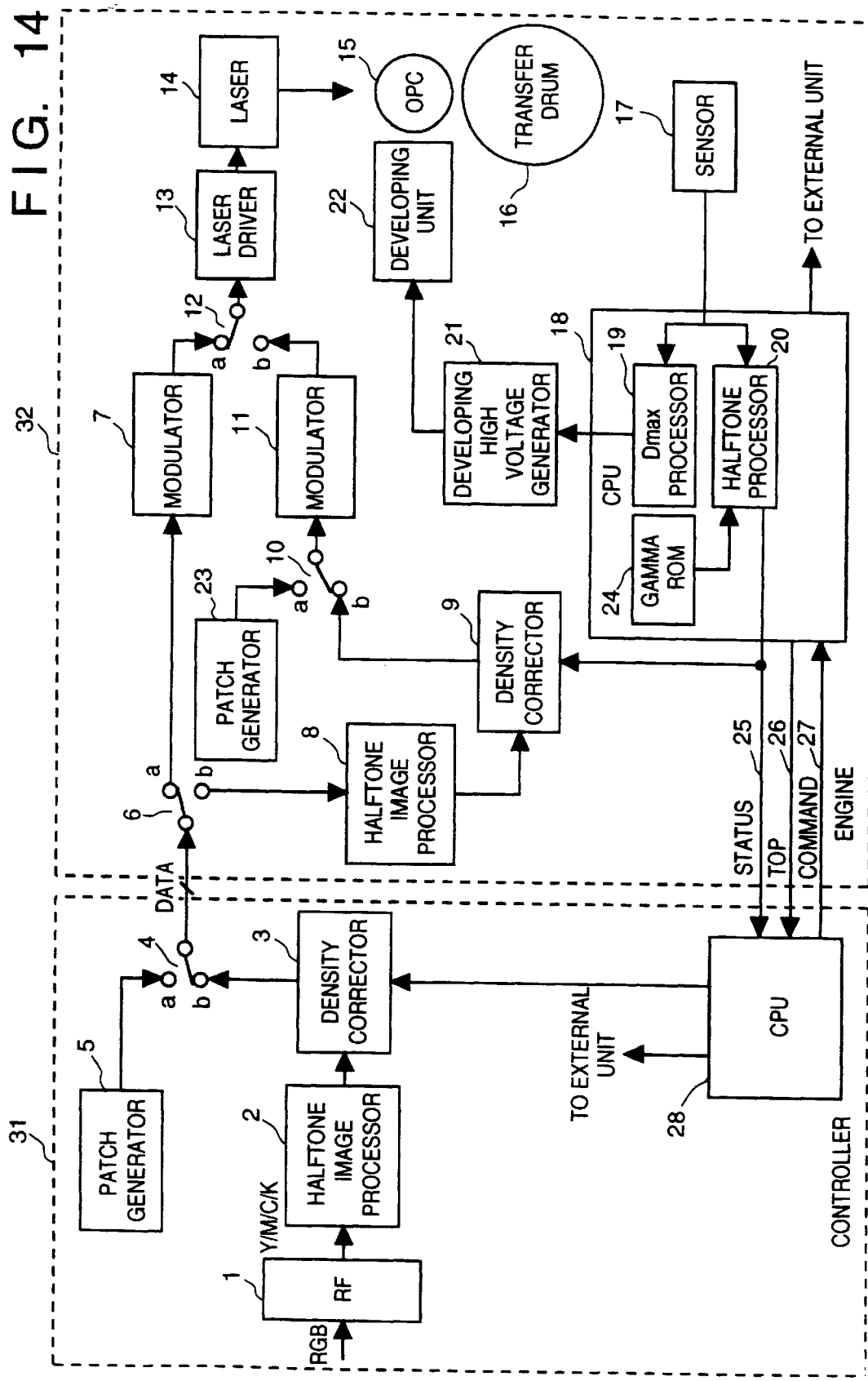
FIG. 14 is a block diagram showing an example of an arrangement according to a second embodiment.

In FIG. 14, density control is carried out using video interface lines between the controller and the engine, namely a command signal line 27 for transmitting eight-bit serial signal in order to designate various operations in the engine, a status signal line 25 for receiving an eight-bit serial signal in order to ascertain the status of the engine, an eight-bit parallel data signal line for transmitting print data to the engine, and a top signal line 26 which the engine uses to request image data.

Figure 15:
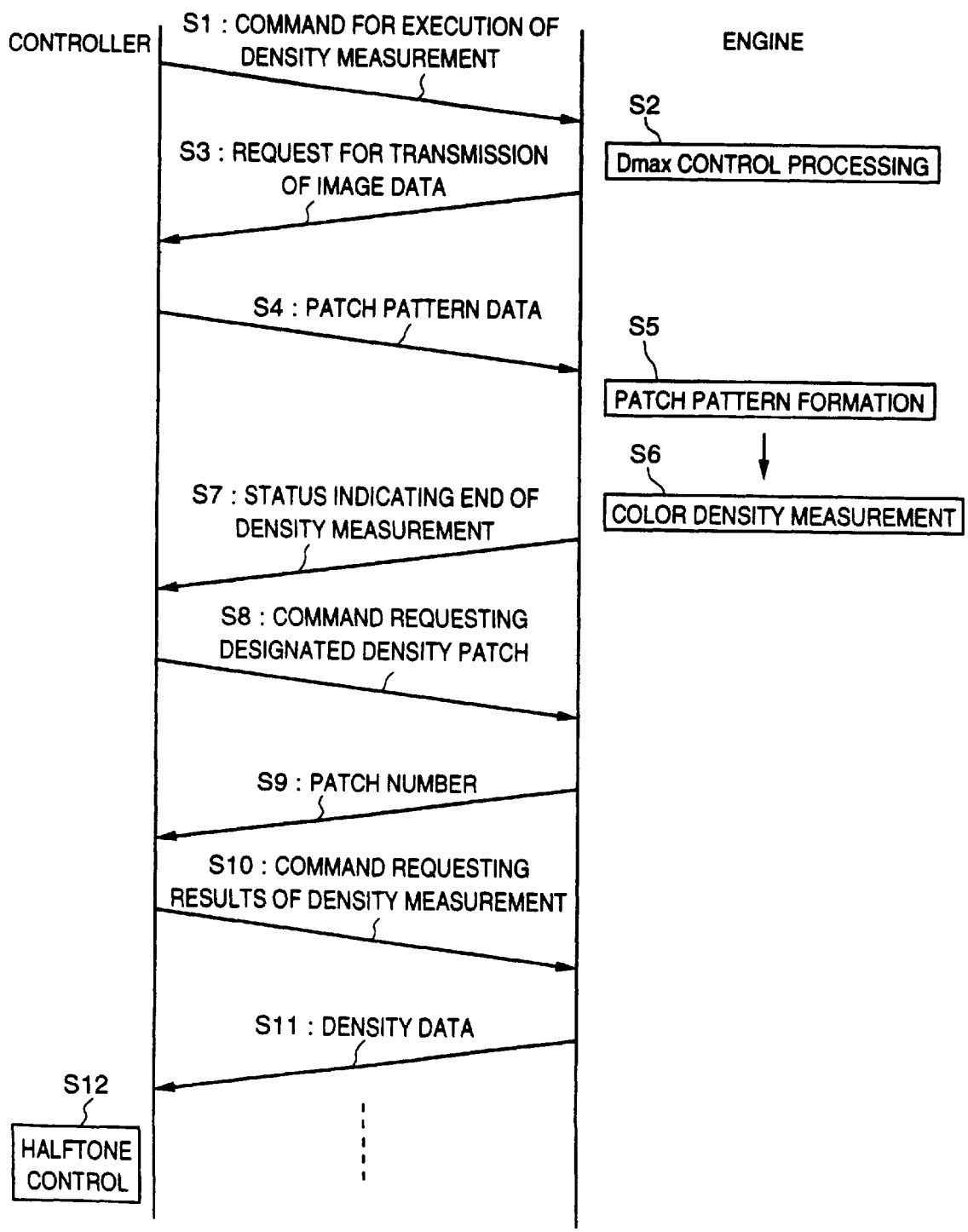
FIG. 15 is a diagram showing an example of operation in density control processing.

The operating procedure in density control according to this embodiment is illustrated in FIG. 15. First, a CPU 28 within the controller 31 sends a density-measurement execution command to the engine 32 via the command line when density control is required (S1). After receiving the density-measurement execution command, the engine 32 finishes Dmax control within the engine (S2). When a state is attained in which density measurement becomes possible in response to a request from the controller 31, the engine 32 uses the top signal line to request the controller 31 to transmit image data (S3). In response, the CPU of the controller 31 changes the switch 4 over to the side (a) of the patch pattern generator 5 and sends, say, eight items of patch pattern data for each color to the engine 32 via the data signal line (S4). The engine 32 thenceforth forms each of the patch patterns on the transfer drum through a sequence similar to that described above (S5), measures the density of each color by the density sensor 17, stores the measured densities in a memory (not shown) within the halftone processor (S6) and returns a status signal indicating end of density measurement to the controller 31 via the status line (S7).

Upon receiving the status signal indicating end of density measurement, the controller 31 sends the engine 32 a designated density-patch request command via the command signal line in order to ascertain the number of a patch (one among eight patterns for each color) corresponding to density data sent from the engine (S8). Upon receiving this command, the engine 32 sends the designated patch number back to the controller 31 via the status signal line (S9).

Next, when a density-measurement result request command is sent from the controller 31 via the command signal line (S10), the engine 32 reads the density data of the designated patch out of the memory and sends back the data, via the status signal line, as the result of density measurement (S11). After the aforementioned steps S8~S11 have been repeated with regard to all patches, the controller 31 obtains a density characteristic, of the kind illustrated at 72 in FIG. 6, from eight items of data for each color by means of interpolation processing using the halftone processor within the CPU, and sends this density characteristic to the density corrector 3 of controller 31 as density data (S12).

It should be noted that density control in the engine 32 is periodically performed, which is independent from the above-mentioned density control in the controller 31.

That is, an image forming at 200 lines which is automatically controlled by the engine 32 guarantees the same color forming as that when the apparatus is shipped. On the other hand, an image forming at 600 lines is controlled by the controller 31, thus providing a color forming depending on a usage of the image.

Thus, in accordance with the second embodiment as set forth above, communication of information relating to density control can be carried out accurately between the engine and the controller using the status signal, top signal and command signal. As a result, density control can be performed from the controller side.

(Modification)

An example in which the timing of density control in the second embodiment is judged by the controller upon receiving the status fro the engine will be described as a modification with reference to FIG. 16.

Figure 16:
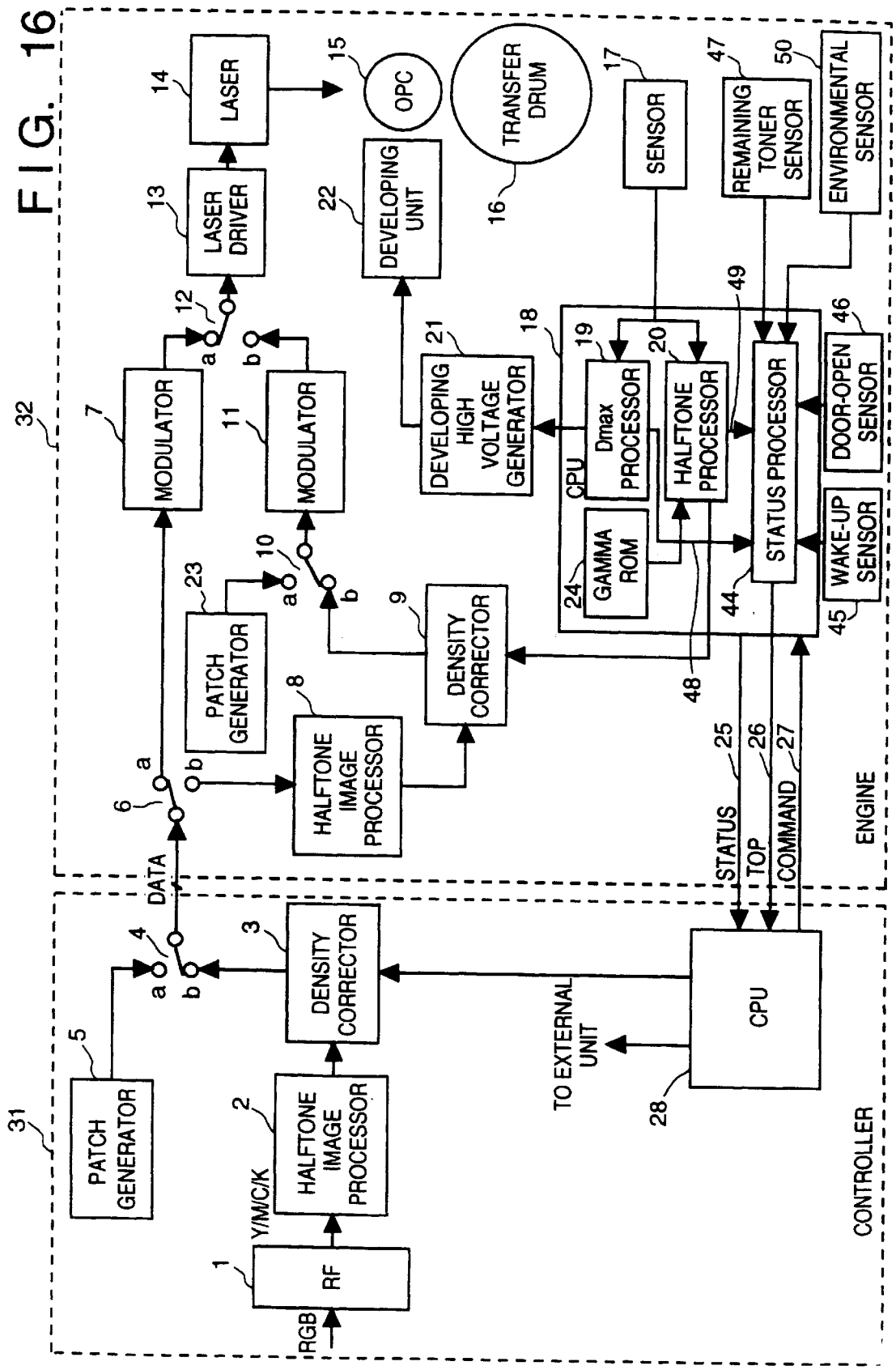
FIG. 16 is a block diagram showing an example of an arrangement according to a modification.

FIG. 16 is a block diagram showing an example of the arrangement of the controller and engine in an image forming apparatus according to this modification of the invention.

A wake-up signal from a wake-up sensor 45, a door-open signal from a door-open sensor 46 and a toner signal, which indicates whether or not there is any toner, from a remaining-toner sensor 47 are connected to ports of the CPU 18. Along with a signal 48 indicating completion of Dmax control within the engine and a signal 49 indicting completion of halftone control within the engine, these signals are sent to the controller 31 as status signals via a status processor 44.

When the printing operation is not in effect, the controller 31 sends a density-control execute status request command to the engine 32 via a command line at a prescribed period. In response to this command, the engine 32 sends a density-control execute status signal back to the controller 31 via the status line. This status signal indicates power-on, door open, remaining amount of toner, completion of Dmax control within the engine and completion of halftone control within the engine, etc.

The controller 31 senses wake-up (restoration from a sleep mode) or door open (as when jamming occurs), which are factors causing an environmental change within the engine. If the amount of remaining toner is adequate, the controller 31 shifts to density-control execution.

Further, when it is sensed that there is inadequate toner, the controller 31 does not execute density control because such control cannot be performed accurately under such conditions.

If it so happens that the current time is a moment immediately after execution of Dmax control in the engine, then Dmax control from the controller 31 is skipped and control starts from halftone control.

If it so happens that the current time is a moment immediately after execution of halftone control, the number of patches formed at detection of density is reduced so that the time needed for density control can be curtailed.

According to this embodiment, the signal indicating completion of Dmax control and the signal indicating completion of halftone control are used as control status signals within the engine. However, a signal indicating that execution of Dmax control is in progress or a signal indicating that execution of halftone control is in progress may be used together with these signals.

In accordance with this embodiment, as described above, wake-up sensing means, a door-open sensing means and residual-toner sensing means, which is used to determine whether performing density control is meaningful or not, are employed to sense a change in the status of an engine for which there is a possibility that density control is necessary. Along with these signals, signals indicating status of density control execution by the engine itself, namely a signal indicating completion of Dmax control within the engine and a signal indicating completion of halftone control within the engine are sent to a controller. As a result, the controller is capable of appropriately judging the timing at which density control should be executed, thus making highly precise control of density possible.

Further, waiting time until printing begins can be shortened because the foregoing need not be performed redundantly with regard to density control requests from both the controller and engine.

Further, S8~S11 shown in FIG. 15 may be converted to a step of issuing a command for designating a density patch number, a step of issuing a command requesting the results of density measurement, and a step of receiving, in the form of a status signal, results of density measurement of the designated density patch number.

Further, an arrangement may be adopted in which the controller determines whether Dmax control is to be performed or not. Specifically, in the command (S1) for executing measurement of density in FIG. 15, an arrangement may be adopted in which it is possible to designate whether Dmax control is to be performed or not. A case in which Dmax control is passed may start from S4.

Further, an arrangement may be adopted in which whether or not Dmax control is to be performed is judged by the controller based upon a status signal from the engine. Specifically, an arrangement may be adopted in which when Dmax control was performed is indicated by a status signal, with the controller making the judgment based upon elapsed time from the previous Dmax control event.

Further, though the formed patches shown in FIG. 12 are formed for every color, it is permissible to form them for every halftone, as shown in FIG. 17.

Further, though an LBP is employed in the foregoing embodiments, this does not impose a limitation upon the present invention. For example, it is permissible to use an image processing apparatus in which an image is formed by employing a head of the type in which film boiling is produced by thermal energy so as to jet droplets of ink.

Further, the controller in each of the foregoing embodiments may reside in a host device such as an external apparatus. Furthermore, in case of forming an image at 200 lines, an input signal may be processed to pass through the halftone image processer 2 and the density corrector 3 in the controller 31.

An arrangement may also be adopted in which each of the halftone image processer 2 and the density corrector 3 provides a halftone image processing at 200 and 600 lines and a density correction for 200 and 600 lines. In this arrangement, the halftone image processing and the density correction for 200 lines and these processing and correction for 600 lines are switched over properly. Moreover, in this case, it may also be arranged that a density control for both 600 lines and 200 lines in accordance with a control of the controller 31 by holding the patch data for 600 and 200 lines in the patch generator 5.

As many apparently widely different embodiments of the present invention can be made without departing from the spirit and scope thereof, it is to be understood that the invention is not limited to the specific embodiments thereof except as defined in the appended claims.

What is claimed is:

1. A controller unit for outputting color image data to an image forming unit which automatically controls an image forming condition of an image forming process, said controller unit comprising:

bi-directional communication means for bi-directional communication with said image forming unit;

transmitting means for transmitting data representing first patches to said image forming unit in accordance with information, which relates to completion of control for the image forming condition, obtained by said bi-directional communication;

controller calculating means for calculating controller color-correction data on the basis of data representing the formed first patches, formed by said image forming unit, obtained by said bi-directional communication; and controller color-correcting means for performing controller color-correction by using the controller color-correction data calculated by said controller calculating means.

2. The controller unit according to claim 1, further comprising commanding means for commanding said image forming unit, using said bi-directional communication means, to form the first patches.

3. The controller unit according to claim 1, wherein said image forming unit comprises:

correction means for performing correction on the basis of correction data;

generating means for generating data to form second patches; and calculation means for calculating the correction data on the basis of data representing the formed second patches.

4. The controller unit according to claim 1, further comprising first patch-data generating means for generating first patch data used when the first patches are formed by said image forming unit.

5. A controller unit for outputting color image data to an image forming unit having controlling means which automatically controls an image forming condition of an image forming process, said controller unit comprising:

bi-directional communication means for bi-direction communication with said image forming unit;

controller calculating means for calculating controller color-correction data on the basis of data representing patches, formed by said image forming unit, obtained by said bi-directional communication; and controller color-correcting means for performing controller color-correction by using the controller color-correction data calculated by said controller calculating means, wherein said controlling means of said image forming unit controls the image forming condition to control a Dmax within nearby a predetermined value.

6. An image processing apparatus having a controller unit for converting entered image information to a multivalued image signal, and an engine, wherein said controller unit includes:

image processing means for processing the entered image information; and first density-control processing means for automatically performing first density control processing; and said engine includes:

image forming means for forming an image on the basis of the multivalued image signal;

second density-control processing means for automatically performing second density control processing; and transferring means for transferring patch information, which represents patches formed by said image forming means, to said first and second density-control processing means.

7. The apparatus according to claim 6, wherein said transferring means performs bi-directional communication between said engine and said controller unit.

8. A control method for outputting color image data to an image forming unit which automatically controls an image forming condition of an image forming process, said method comprising the steps of:

performing bi-directional communication with said image forming unit;

transmitting data representing patches to said image forming unit in accordance with information, which relates to completion of control for the image forming condition, obtained by said bi-directional communication;

calculating controller color-correction data on the basis of data representing the formed patches, formed by said image forming unit, obtained by said bi-directional communication; and performing controller color-correction by using the controller color-correction data.

9. An image processing method having a converting step of converting entered image information to a muiltivalued image signal, and an image forming step of forming an image on the basis of the multivalued image signal, wherein said converting steps includes the steps of:

processing the entered image information; and automatically performing first density control processing; and said image forming step includes the steps of:

automatically performing second density control processing; and transferring patch information, which represents patches formed by said image forming step, to said first and second density-control processing steps.

10. A controller unit for outputting color image data to an image forming unit which automatically controls an image forming condition of an image forming process, said controller unit comprising:

bi-directional communication means for bi-directional communication with said image forming unit;

controller calculating means for calculating controller color-correction data on the basis of data representing patches, formed by said image forming unit, obtained by said bi-directional communication;

controller color-correcting means for performing controller color-correction by using the controller color-correction data calculated by said controller calculating means; and commanding means for commanding said image forming unit, using said bi-directional communication means, to form the patches, wherein said bi-directional communication means obtains status information of said image forming unit by the bi-direction communication.

11. An image processing apparatus having a controller unit for converting input image information to a multivalued image signal, and an engine, said controller unit comprising:

image processing means for processing the input image information; and first density-control processing means for automatically performing first density-control processing, said engine comprising:

image forming means for forming an image on the basis of the multivalued image signal;

second density-control processing means for automatically performing second density-control processing; and transferring means for transferring patch information, which represents patches formed by said image forming means, to said first and second density-control processing means, said first density-control processing means automatically sets first image-correction parameters in accordance with the patch information, and said second density-control processing means automatically sets second image-correction parameters and a process condition of said image forming means in accordance with the patch information.

12. The image processing apparatus according to claim 11, wherein the first and second density-control processing is independently performed.

13. The apparatus according to claim 12, wherein said engine comprises means for controlling an image forming condition of said image forming means.

14. The apparatus according to claim 13, wherein the image forming condition is a condition of Dmax control.

15. An image forming apparatus comprising:

color correction means for performing color correction on the basis of a color-correction condition;

image forming means for forming a color image on the basis of an image forming condition;

first controlling means for controlling the color-correction condition;

second controlling means for controlling the image forming condition; and instructing means for issuing an instruction which represents whether the color-correction condition and the image forming condition are controlled or only the color-correction condition is controlled.

16. The apparatus according to claim 15, wherein the instruction is issued based on a status of said image forming apparatus.

17. The apparatus according to claim 16, wherein said image forming means includes a control function which controls the forming condition regardless of the instruction.

18. An image processing method comprising the steps of:

controlling a color-correction condition based on formed patches;

performing color correction on input image data based on the color-correction condition;

controlling an image forming condition based on the formed patches;

forming a color image on the basis of the image forming condition and the image data on which the color correction is performed; and selecting between a first mode in which the color-correction condition and the image forming condition are controlled and a second mode in which the color-correction condition is controlled without controlling the image forming condition.

19. The method according to claim 18, further comprising the step of forming an image on a recording medium based on the image forming condition and the image data on which the correction in accordance with the controlled color-correction condition is performed.

20. An image processing method for forming an image based on input image data by using an engine, said method comprising the steps of:

calculating a first processing condition on the basis of color data representing first patches which are formed by said engine;

performing a first color-correction on the input image data in accordance with the first processing condition;

calculating a second processing condition on the basis of color data representing second patches which are formed by said engine; and performing second color-correction on the image data on which the first color-correction is performed, in accordance with the second processing condition, wherein the first and second color-corrections are mutually independently performed.

21. An image forming unit which automatically controls an image forming condition of an image forming process and receives color image data from a controller unit, said image forming unit comprising:

bi-directional communication means for bi-directional communication with said controller unit;

first transmitting means for transmitting complete information, which relates to completion of control for the image forming condition, through said bi-directional communication;

receiving means for receiving data representing patches from said controller unit which received the complete information, through said bi-directional communication; and second transmitting means for transmitting data representing the formed patches through said bi-directional communication so that said controller unit will calculate controller color-correction data on the basis of the data representing the formed patches for performing controller color-correction.

22. An image forming method which automatically controls an image forming condition of an image forming process and receives color image data from a controller unit, said method comprising the steps of:

performing bi-directional communication with said controller unit;

transmitting complete information, which relates to completion of control for the image forming condition, through said bi-directional communication;

receiving data representing patches from said controller unit which received the complete information, through said bi-directional communication; and transmitting data representing the formed patches through said bi-directional communication so that said controller unit will calculate controller color-correction data on the basis of the data representing the formed patches for performing controller color-collection.

* * * * *

UNITED STATES PATENT AND TRADEMARK OFFICE
CERTIFICATE OF CORRECTION

PATENT NO.    : 6,111,664
DATED         : August 29, 2000
INVENTOR(S)   : Akio Aoki et al..

It is certified that error appears in the above-identified patent and that said Letters Patent is hereby corrected as shown below:

ON TITLE PAGE

In [56] References cited, under U.S. PATENT DOCUMENTS:

--5,191,361 3/1993 Abe......358/500-- should be inserted.

COLUMN 4
Line 51, "is charges" should read --is charged--.

COLUMN 8
Line 60, "making is" should read --making it--.

COLUMN 9
Line 32, "of its" should read --on its--; and
Line 51, "condition" should read --conditions--.

COLUMN 10
Line 25, "of version" should read --a version--; and
Line 49, "is capable" should read --is capable of--.

UNITED STATES PATENT AND TRADEMARK OFFICE
CERTIFICATE OF CORRECTION

PATENT NO.   : 6,111,664
DATED        : August 24, 2000
INVENTOR(S)  : Akio Aoki et al..

It is certified that error appears in the above-identified patent and that said Letters Patent is hereby corrected as shown below:

COLUMN 11
Line 56, "as the" should read --as a--.

COLUMN 12
Line 17, "fro" should read --for--.

Signed and Sealed this

Twelfth Day of June, 2001

*Nicholas P. Godici*

Attest:

Attesting Officer

NICHOLAS P. GODICI
*Acting Director of the United States Patent and Trademark Office*